United States Patent [19]

Ceriani

[11] Patent Number: 4,895,395
[45] Date of Patent: Jan. 23, 1990

[54] RAPID-ACTION CONNECTOR FOR FLEXIBLE TUBES OR PIPES WITH CONICAL RETAINING RING

[75] Inventor: Giuliano Ceriani, Marcallo Con casone, Italy

[73] Assignee: Finimpresa S.P.A., Mesero, Italy

[21] Appl. No.: 271,033

[22] Filed: Nov. 14, 1988

[30] Foreign Application Priority Data

Mar. 22, 1988 [IT] Italy .................... 19888 A/88

[51] Int. Cl.⁴ .................................. F16L 37/00
[52] U.S. Cl. ............................ 285/39; 285/340
[58] Field of Search .................. 285/340, 323, 39

[56] References Cited

U.S. PATENT DOCUMENTS

| | | | |
|---|---|---|---|
| 3,312,484 | 4/1967 | Davenport | 285/340 |
| 3,999,783 | 12/1976 | Legris | 285/323 X |
| 4,072,328 | 2/1978 | Elliott | 285/340 X |
| 4,288,113 | 9/1981 | Saulnier | 285/340 X |
| 4,593,943 | 6/1986 | Hama et al. | 285/340 X |

FOREIGN PATENT DOCUMENTS 2622269 11/1977 Fed. Rep. of Germany ...... 285/340
6700801 7/1967 Netherlands .................. 285/340

Primary Examiner—Thomas F. Callaghan
Attorney, Agent, or Firm—Herbert Dubno

[57] ABSTRACT

Quick connector for flexible tubes or pipes, which comprises a hollow body, equipped on the inside with a seating for an annular seal, to which body is secured a collar carrying a conical elastic ring having radial slits open towards the inner edge, the ring diverging towards the free end of the body, into which conical ring there may be inserted a flexible tube in sealing contact with the annular seal, which tube can be advanced towards the interior of the hollow body with limited elastic deformation of the conical ring and in conditions of jamming of said conical ring when the tube moves outwards, there being also present a shell projecting outwards from the body and surrounding the flexible tube and having a tapered end towards the inside, the shell being in contact with the internal edge of the slit conical ring and being adapted for preventing, when pushed inwards into the hollow body, the jamming of the conical ring on the surface of the flexible tube, thus making its withdrawal possible.

3 Claims, 1 Drawing Sheet

RAPID-ACTION CONNECTOR FOR FLEXIBLE TUBES OR PIPES WITH CONICAL RETAINING RING

FIELD OF THE INVENTION

The present invention relates to a rapid-action connector for flexible tubes or pipes, capable of being disconnected, with retention of the tube by jamming means.

BACKGROUND OF THE INVENTION

For the connection of flexible tubes to fixed devices, such as valves, joint elements, reducers, user equipment and the like, connections of various types are used; generally it is required that such connectors assure both the hydraulic or pneumatic seal and also the mechanical locking of the tubes.

A fundamental requirement, especially for installations in the case of the construction of large dimensions, such as for example industrial or domestic hydraulic distribution systems, is that the connections can be made especially rapidly without, however, detracting from the firmness and stability of the connection.

In many cases, moreover, the flexible tubes or pipes used are subject to dimensional variations, for example as a consequence of temperature fluctuations during operation, as in the case of heating or hot water distribution installations, or due to a drop in the ambient temperature; in such cases, as a result of an expansion, it is possible for the tube to depart from the path assigned to it. Compression forces may act upon the end connections of the tube and results in contraction. In the case where a departure from the path of the tube in a layout of short length is prevented, for example in the case of an initial straight layout, tensile forces act upon the end connections, which may also lead to disengagement of one end of the tube from the connection.

OBJECT OF THE INVENTION

It is the object of this invention, therefore, to provide a connection which shall assure a solid mechanical locking to the tube, which shall be capable of being disconnected in an especially rapid manner and which shall moreover be capable of enabling axial deviation of the end of the tube without alteration of its mechanical connection or its hydraulic seal.

SUMMARY OF THE INVENTION

These results are achieved by the present invention, which provides a quick-release connector for flexible tubes and pipes which comprises a hollow body, equipped in its interior with a seat for an annular seal. To this body there is secured a collar carrying a conical elastic ring having radial slits open towards its inner edge, the conical ring diverging towards the free end of the body. In to the conical ring there may be inserted a flexible tube in sealing contact with the annular seal, which tube can be advanced towards the interior of the hollow body with limited elastic deformation of the conical ring and so that jamming of said conical ring occurs upon movement of the tube in the outward direction. There is provided a shell projecting externally from the body and surrounding the flexible tube and having its inward end tapered and in contact with the inner edge of the conical ring, the shell being adapted for preventing, when it is pushed inwards towards the interior of the hollow body, jamming of the conical ring upon the surface of the flexible tube, thus allowing withdrawal of the tube.

The collar may be rigidly secured to the hollow body or, alternatively, the collar can integrally carry the conical elastic ring and is axially slidable inside the hollow body between extreme stop positions, with a travel greater than or equal to the maximum dimensional variation intended for the flexible tube.

The seat for the annular seal can comprise a retaining ring blocking off the seal from the outside of the hollow body.

The retaining ring is advantageously axially blocked by the collar, rigidly secured to the hollow body.

The collar, according to one embodiment, may have projecting fins bearing against the retaining ring.

In addition, in this embodiment, the collar possesses folded fins securely holding the slit conical ring firmly to the collar.

Alternatively, the retaining ring and the conical ring may be tightened as a unit by the collar rigidly secured inside the hollow body.

In the case where the collar is slidable, the retaining ring is rigidly secured inside the hollow body independently of the collar itself.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
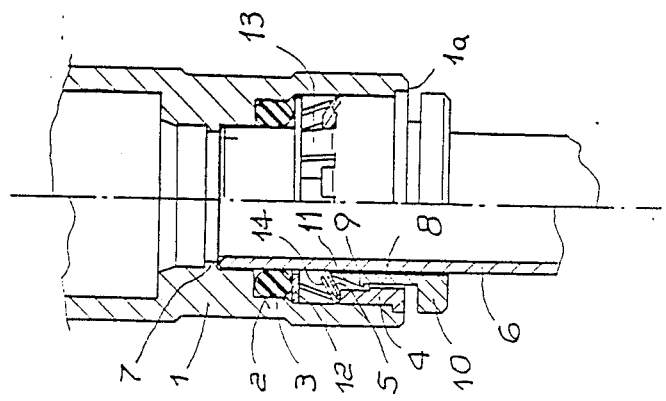
FIG. 1 is an axial section of a quick-release connector, according to the invention, designed for connecting copper pipes.

FIG. 1 shows, the connector according to this invention, for securing a tube of the flexible type to a fixed member such as in the case of domestic hydraulic installations, is composed of a hollow body 1 of substantially cylindrical form, firmly fixed to the apparatus to which the tube is to be connected. Inside of the hollow body there is formed a seat 2 for a toroidal seal 3; a collar 4, secured to the body 1, carries a conical elastic ring 5 having radial slits open towards the inner edge, shown in unsectioned view in the left half of FIG. 2.

The slit conical ring 5, diverging towards the free end of the body 1 (i.e. downwardly in FIGS. 1–3), receives inside itself the end of a tube 6 as a result of the elastic bending of the strips 5a defined by the radial slits, thus allowing insertion of the tube into the body 1 as far as its internal annular stop projection 7, but resists, by jamming or wedging action of said strips 5a on the surface of the tube, subsequent withdrawal of said tube, thereby assuring its retention in position; the hydraulic seal of the joint is guaranteed by the sealing ring 3 traversed by the tube 6.

Inside the collar 4 there is also present a slidable shell 8, equipped with an annular ridge 9 which forms a stop against a corresponding internal shoulder of the shell 4, adapted for preventing its retraction outwards, and with a bearing flange 10, by which the shell 8 can be pushed with its tapered end 11 into contact with the inner edge of the strips 5a of the ring 5, thereby causing the ring to expand and allowing the tube 6 to be withdrawn from the body 1.

In this manner, the operations of engagement and disengagement of the tube into and from the body 1 are rendered extremely simple and rapid, without however prejudicing the mechanical firmness and stability of the joint.

The tube 6 may be of metal, for example copper, or may be of plastic material having suitable mechanical characteristics for the intended use, such as for example polypropylene, suitable for use in domestic hydraulic installations and the like.

For retaining the seal 3 in its seating, a retaining ring 12 is provided. This ring can be fixed in the axial direction by the collar 4.

In the embodiment illustrated in FIG. 1, the ring 12 is a flat ring and the collar 4 possesses axial fins 13 bearing against it; the fins 13, as can be seen more clearly in the right half of FIG. 1, are deflected inwards by a small angle and alternate with fins 14 having a greater deformation, by means of which the conical ring 5 is secured to the collar 4, at a sufficient distance from the retaining ring 12 to allow the deformation of the conical ring during the engagement and withdrawal of the tube or pipe 6.

The fins 13 may also be helically twisted, assuring with their less deformed edge the securing of the retaining ring 12 and with their opposite edge, having a greater bend, the securing of the conical ring 5; in this case it is not necessary to provide fins 14 for blocking the conical ring 5.

Figure 2:
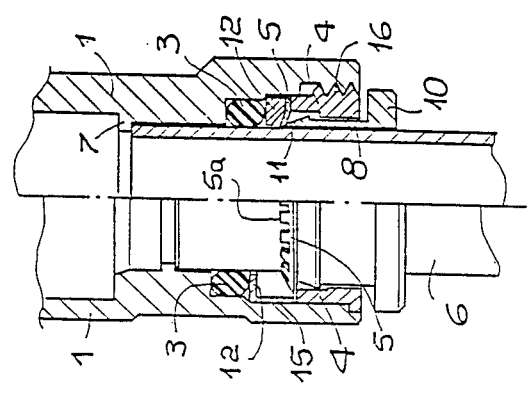
FIG. 2 is a similar view of another embodiment.

Alternatively, the retaining ring 12 may extend axially towards the collar 4, for example possessing a cylindrical portion 15 as illustrated in the left part of FIG. 2, or being formed with a greater thickness, as illustrated in FIG. 2 in the right part. In such cases the securing in position of the ring 12 and of the conical ring 5 is ensured by tightening of the rings as a unit against an internal stop surface 16 of the body 1, by means of the collar 4.

The seat 2 for the seal 3 may also be constructed in the form of an annular groove inside the body 1, closed on three sides, and in this case there is no requirement for providing a retaining ring.

The collar 4, in turn, may be secured to the body 1 by a force fit, as indicated in FIG. 1 and in the left part of FIG. 2, or may be secured by adhesives or again by screwing, by means of associated screwthreads 16, as illustrated in the right part of FIG. 2.

Figure 3:
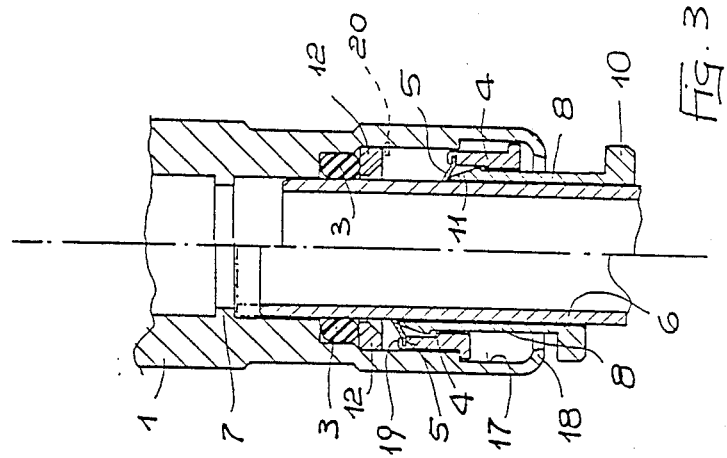
FIG. 3 is an axial section through a connector according to this invention provided with a facility for compensating expansions.

In the case where the tube or pipe 6 is subject to considerable variations in dimensions, for example due to temperature changes, as in the case of tubes of plastic material, the collar 4 is made slidable inside the body 1 as illustrated in FIG. 3, inside a sliding seat 17 bounded at the outside by a rim or flange 18 or the like, which prevents withdrawal of the collar 4; the conical ring 5 is secured to the collar 4 for example by means of an inwardly bent flange 19.

In this embodiment, the retaining ring 12 for the seal 3 is secured in position independently of the collar 4, for example by means of a force fit inside the body 1 or, as indicated by broken lines in 3, by a retaining ring 20 inserted into a suitable groove.

This arrangement allows the collar 4, holding the tube 6 secured by means of the ring 5, to slide inside the hollow body 1 as a consequence of axial expansions or contractions of the tube, thereby avoiding the transmission of loads to the body 1 or the causing of deformations or inflections to the tube.

For this purpose, the tube 6, which usually at the time of assembly is in an intermediate position of its dimensional travel, is mounted inside the ring 5 without coming into bearing against the bottom projection 7, as indicated in full line in the left part of FIG. 3, stopping at a certain distance from this projection; as a result of a subsequent expansion, for example when the maximum operating temperature is reached, the tube can slide inside the ring 5 until it is near the projection 7.

A subsequent contraction of the tube 6, for example when the minimum operating temperature of the plant is reached, leads to sliding of the collar 4 in the outward direction inside its seating 17, withdrawal of the tube being prevented by the ring 5, as shown in the right part of FIG. 3.

The collar or sleeve 8 is made of sufficient length to allow the required sliding distance.

In the case where the tube 6 is fitted into the hollow body 1 in conditions of maximum extension of said tube, for example when the tube is at the maximum intended operating temperature or is under axial tension, the tube may be inserted into the ring 5 until it bears against the projection 7.

Numerous variants can be introduced, without thereby departing from the scope of the present invention in its general characterisics.

I claim:

1. A rapid-action connector comprising:
an elongated hollow body having a longitudinal axis, an open end adapted to receive a tube connectable to said body, a first shoulder forming a seat spaced axially inwardly from said end, and a second shoulder spaced axially inwardly from said first shoulder;
a generally toroidal seal member lying against said seat and sealingly engaging said tube for forming a seal between said body and said tube while permitting relative axial displacement between said tube and said seal, said tube being engageable with said second shoulder to limit said relative axial displacement;
a slit conical ring diverging toward said open end, received in said body and formed with elastically bendable strips continuously connected together at a wide side of said ring turned toward said end and at which said ring has a continuous rim, said strips having free ends gripping said tube upon insertion of said tube through said ring and said seal member so that said ring is bodily displaced axially upon relative displacement of said tube and said body;
a sliding collar received in said body, said rim being fixed in said collar, said body being formed with a stop limiting axial displacement of said collar relative to said body toward said seal member, said body being further formed with an inwardly turned flange at said open end preventing withdrawal of said collar from said body, said body having a sliding seat between said stop and said flange on which said collar is guided; and
a release sleeve surrounding said tube, disposed within said sliding collar and extending into said body through said open end, said release sleeve having a conical ramp at an end thereof turned toward said ring for deflecting said strips away from said tube for quick release of said tube from said body upon displacement of said sleeve into said body.

2. The rapid-action connector defined in claim 1, further comprising a retaining ring in said body holding said seal member against said first shoulder.

3. The rapid-action connector defined in claim 12, further comprising a spring ring engaged in said body and holding said retaining ring thereon.

* * * * *